United States Patent [19]

Hanabusa

[11] Patent Number: 4,862,331
[45] Date of Patent: Aug. 29, 1989

[54] DETACHABLE REAR-MOUNTED LIGHT FOR A MOTORCYCLE HELMET

[76] Inventor: Akira Hanabusa, 1045 S. Ridgeley Dr., Los Angeles, Calif. 90019

[21] Appl. No.: 319,371

[22] Filed: Mar. 6, 1989

Related U.S. Application Data

[62] Division of Ser. No. 139,401, Dec. 30, 1987.

[51] Int. Cl.⁴ .............................................. F21L 15/14
[52] U.S. Cl. ...................................... 362/106; 362/72; 362/191; 362/389; 2/209.2
[58] Field of Search .................. 362/72, 105, 106, 190, 362/191, 389; 2/209.2, 410, 422, 5, 6

[56] References Cited

U.S. PATENT DOCUMENTS

| | | | |
|---|---|---|---|
| 1,900,906 | 3/1933 | Brown | 362/105 |
| 1,901,180 | 3/1933 | McBride | 362/105 |
| 3,793,517 | 2/1974 | Carlini | 362/106 |
| 4,092,704 | 5/1978 | Malm | 362/106 |
| 4,145,328 | 3/1980 | Harris, Jr. | 362/106 |
| 4,319,308 | 3/1982 | Ippoliti et al. | 362/106 |

Primary Examiner—Ira S. Lazarus
Assistant Examiner—Richard R. Cole
Attorney, Agent, or Firm—John J. Posta, Jr.

[57] ABSTRACT

A device for use with a motorcycle helment is disclosed which directs a safety light rearward from the lower back portion of the helmet. The light is removably mounted onto the helmet with a variety of mounting apparatus, each of which allows the light to be quickly and conveniently installed and removed from the helmet. The light, which is entirely self-contained, is mounted onto the helmet in a way allowing the light to detach itself during an accident to avoid inflicting serious head or neck injury on the rider due to the light becoming snagged during the accident.

16 Claims, 3 Drawing Sheets

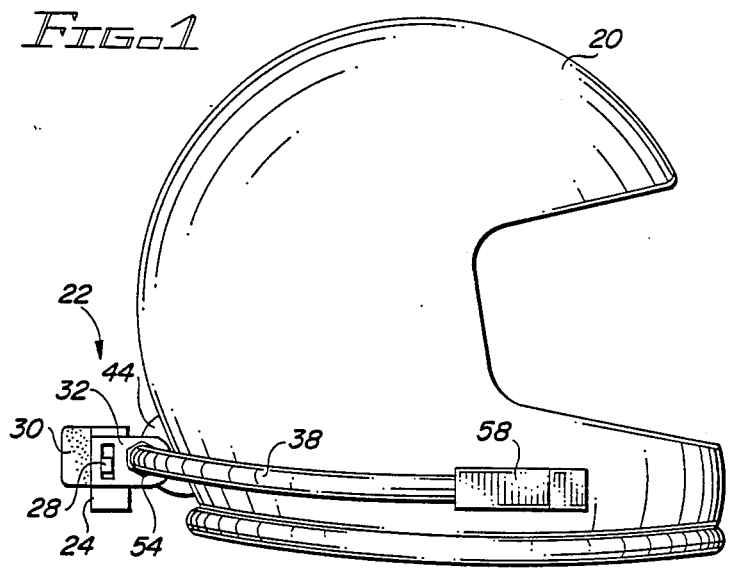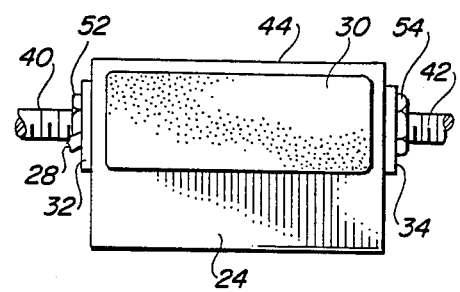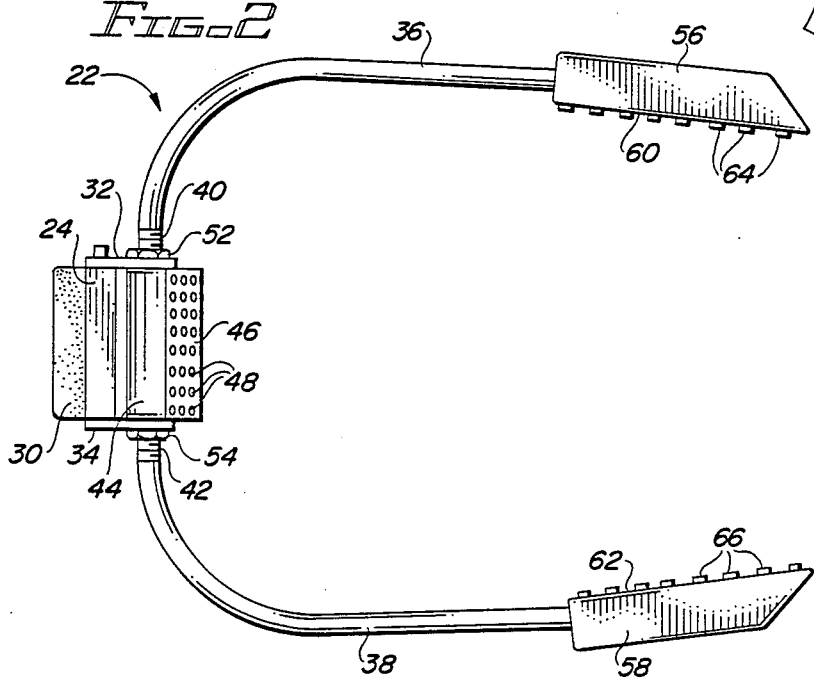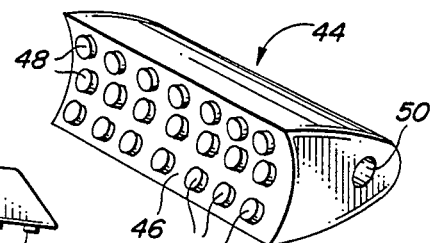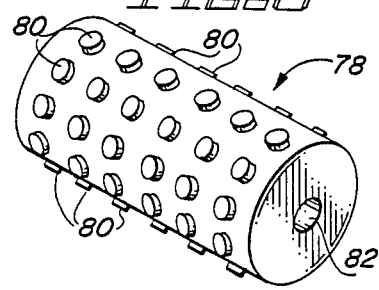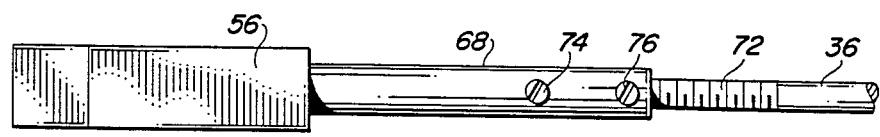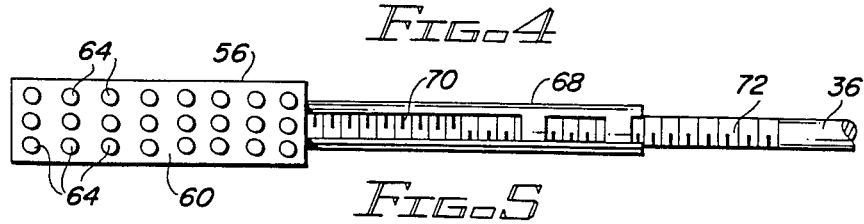

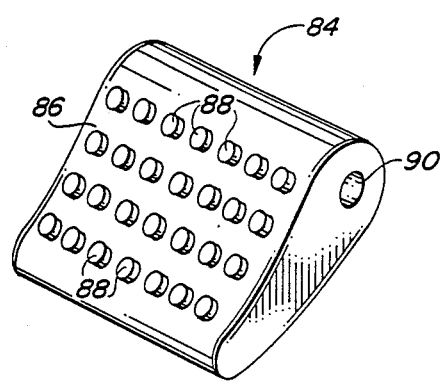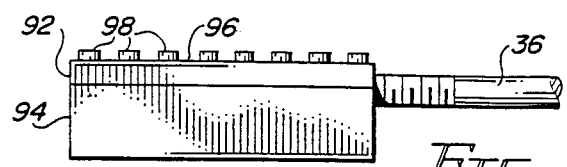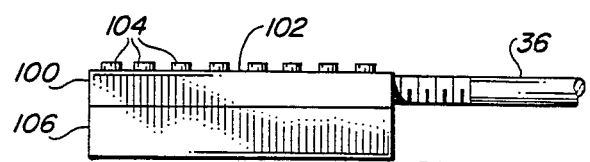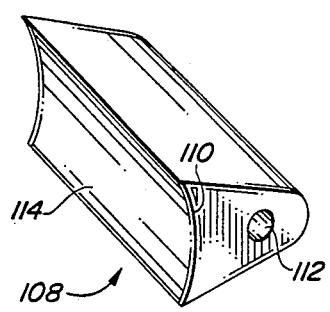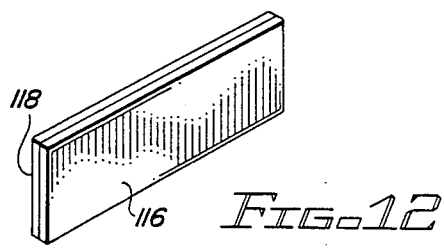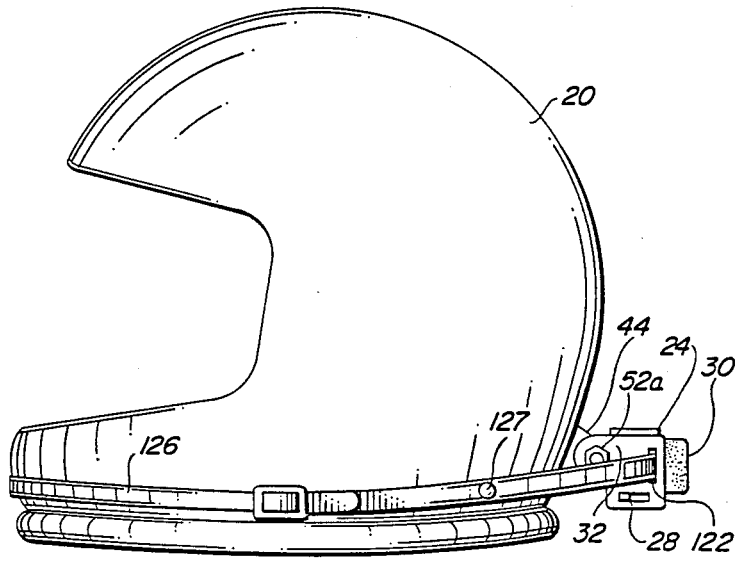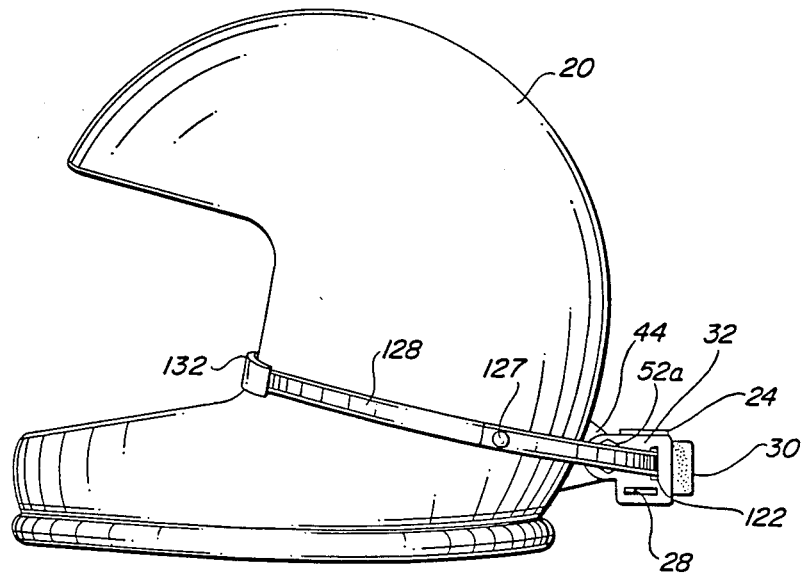

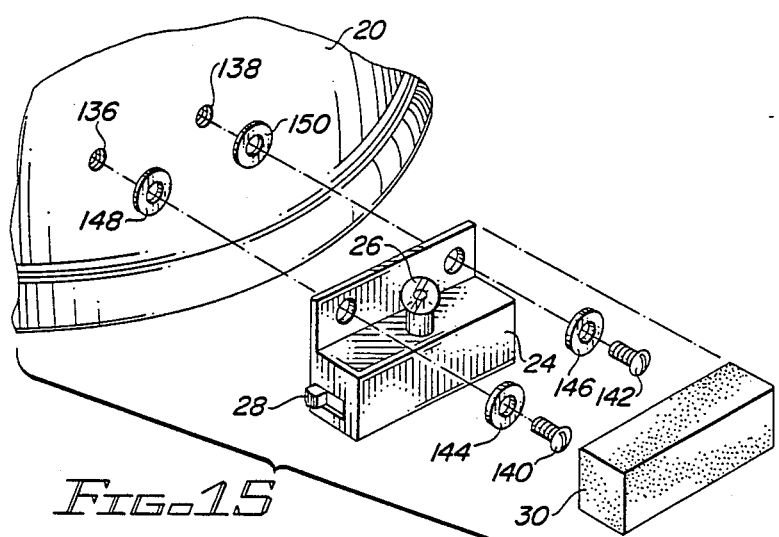
FIG.-15
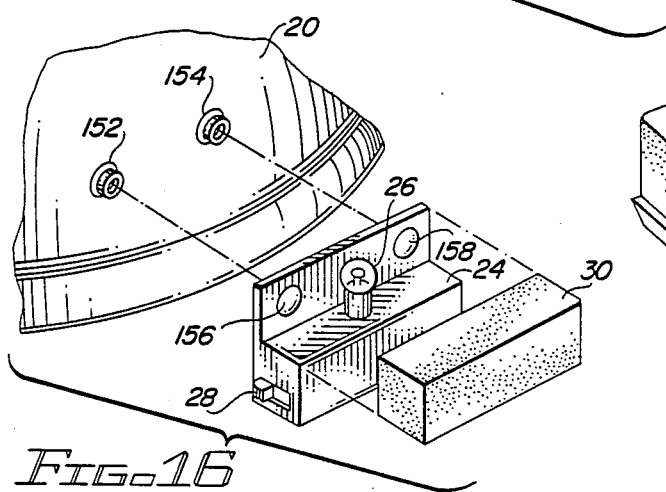
FIG.-16
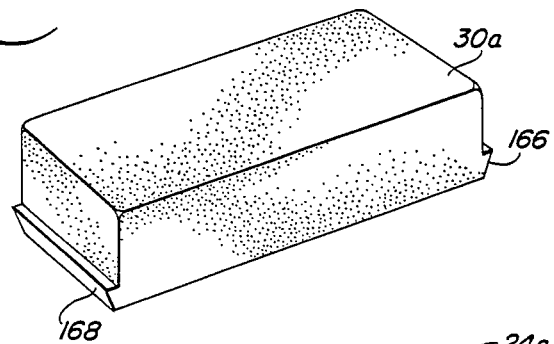
FIG.-17
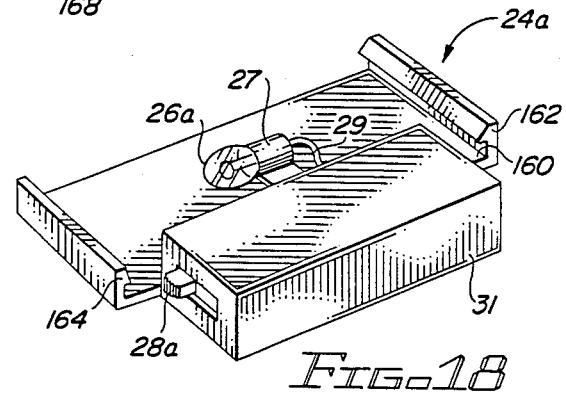
FIG.-18
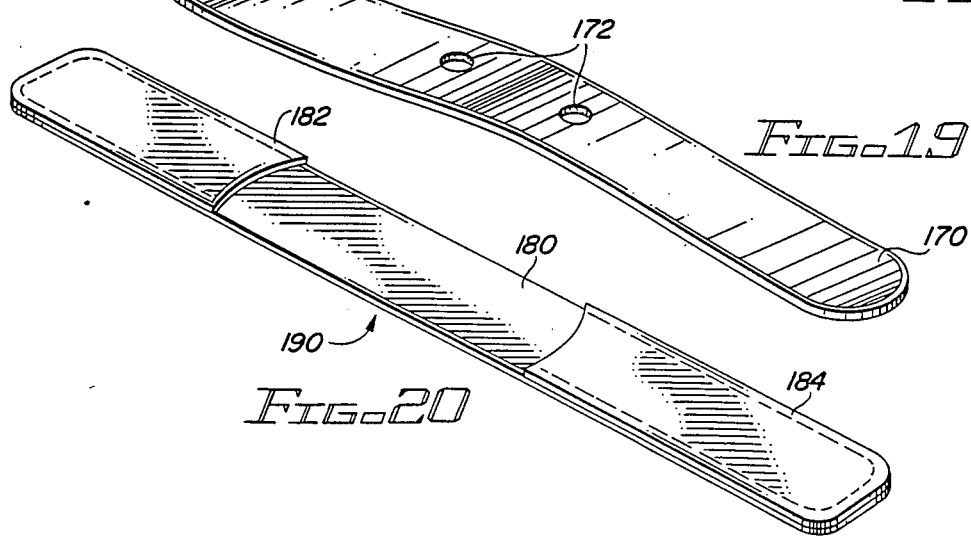
FIG.-19
FIG.-20

DETACHABLE REAR-MOUNTED LIGHT FOR A MOTORCYCLE HELMET

This case is a division of application Ser. No. 07/139,401.

BACKGROUND OF THE INVENTION

1. Field of the Invention

The present invention relates generally to a lighting device for a safety helmet, and more particularly to a small, self-contained, electrical light which can be easily and removably attached to the rear of a motorcycle helmet.

In traffic situations motorcycle riders are much more vulnerable to serious accidents than are motorists in cars. Two of the most common types of situations resulting in accidents are the failure of motorists to see a motorcycle, which is considerably smaller than an automobile, and the failure of a car or other vehicle behind a motorcycle to stop in time when the motorcycle is slowing or stopping. It has been well publicized that the use of a rear window-mounted brake light reduces the incidence of rear end collisions by fifty percent; there therefore exists a clear need for a more visible signal light for use with motorcycles which will be mounted sufficiently high to provide a good measure of visibility.

It is fairly apparent that the only location associated with a motorcycle which is sufficiently high is the motorcyclist himself, and particularly his helmet, which is at the highest location of all. It comes as little surprise that there are several examples of lights intended for use on helmets. The most obvious, and perhaps the oldest, type of helmet light is the type mounted on the helmet to provide visibility to the front, in the direction the wearer's head is directed. A recent example of such a light is found in U.S. Pat. No. 4,195,328, to Harris, Jr., which discloses a helmet-mounted headlight for use in motorcycling.

A slight improvement in the concept is found in U.S. Pat. No. 4,156,942, to Isfeld, which teaches a battery-powered light which is used primarily in a forward position, but which is adjustable to shine to the rear as well. The next logical step is what is best described as a headlight which shines to the rear with a colored lens. Such a device is shown in U.S. Patent No. 3,793,517, to Carlini, which is a light designed for mounting on the top of a helmet or the like. Finally, a built-in rather than an add-on light is shown in U.S. Pat. No. 4,559,586, to Slarve. The Slarve light is a brake light which is contained in the rear of the helmet, and is connected to and powered by the brake light circuit of a motorcycle.

While these devices represent welcome additions to the art and to the safety of motorcyclists, they do present a number of problems. First of all, it is inconvenient at best to use a helmet-mounted lamp which is attached to the electrical system of the motorcycle, as is the Slarve device. Accordingly, an objective of the present invention is to be entirely self-contained, and not dependent of the power supply of the motorcycle.

Secondly, the problem common to all of the aforementioned devices is that they are built-in or permanent helmet devices. The Slarve device is designed into the helmet, and must necessarily be sold as a helmet with a light rather than as a light which may be used with a helmet. The other three devices are bolted or screwed onto the helmet in rather permanent configurations. This presents several problems: first, in the event of an accident the lights present a protuberance from the helmet which could become snagged, causing potentially serious head and neck injuries to the rider. Secondly, with the exception of the Slarve device the devices discussed above are not only unsightly but represent a potential weakening of the helmet due to the location of the holes used to install the devices. Thirdly, the lights are subject to damage if the helmet should drop or fall to the ground, a not infrequent occurrence.

It is therefore a primary objective of the present invention to be removable rather than permanently affixed to the helmet. This offers several advantages, the first of which are the avoidance of the disadvantages enumerated above. By the nature of a removable light, the safety problem of the light snagging during an accident and thereby causing serious head or neck injuries is eliminated. A removable light may be removed when the motorcycle is parked, eliminating the possibility of damage should the helmet fall or be dropped. A removable light need not be attached as securely as a permanently fixed light, thereby reducing or eliminating helmet damage due to apparatus used to permanent secure the light.

Another disadvantage of the fixed lights discussed above is that they are relatively expensive and require installation. An objective of the present invention is an inexpensive design requiring no extensive installation. An inexpensive light is likely to appeal to more people, and a light requiring no installation eliminates the potential cost of that installation and makes the light easier to use by anyone.

The light of the present invention accordingly must fulfill several requirements. It must install onto a helmet, and must direct light to the rear of the helmet to provide a safety signal. It must be easily installable, requiring no complex installation and no tools to install. It must be removable, so that it can be taken off whenever the motorcycle is not in use should the owner so desire.

It must be entirely self-contained, and must therefore carry its own power source. The light should be usable on any helmet, and must therefore be adjustable to fit the many different types of helmets currently available. It must be secure, meaning that it must remain in position on the helmet and not move while the helmet is being worn, yet it must be capable of coming off of the helmet in the event of an accident to prevent it from snagging the helmet and causing injury. The improved light must also accomplish all of the aforesaid objectives and advantages without incurring any significant disadvantage.

SUMMARY OF THE INVENTION

The disadvantages and limitations of the background art discussed above are overcome by the present invention. With this invention, a detachable light is mounted on the back of a helmet near the base thereof. The light has a source of power and is electrically simple, containing only a power source (such as a battery), a bulb and associated circuitry. The light is also capable of being adjusted to the proper viewing angle, a necessity imposed by the broad variations in helmet design.

In the preferred embodiment, a resilient tension mount is used to mount the light at the back of the helmet. Arms encircling the helmet on the sides are biased inwardly to a width narrower than the helmet, and as such will grasp the sides of the helmet firmly when the device is installed. In one variation the arms are adjustable in length, to thereby enable them to fit virtually any size helmet. Elastomeric side grips prevent the ends of the arms from slipping on the helmet.

An elastomeric rear grip pad can be used to retain the light in position on the rear of the helmet and to prevent it from sliding downward. Various different configurations for the rear grip pad are disclosed. The light preferably directs light rearwards and sidewards.

The power source can be solar powered or can be a standard storage battery which may be located either with the light at the back of the helmet, or in a battery compartment mounted on one or both of the side grips.

Several alternate embodiments used to mount the light on the back of the helmet are also disclosed. Two embodiments use one or two elastic straps, the first with a single strap wrapping around the front of the helmet over the protective bar, and the second with straps on both sides having hooks to grasp the front of the helmet. Another embodiment uses mating surfaces of the velco (hook and piles) type. Two other embodiments use snaps or plastic screws to attach the light to the helmet.

It may therefore be perceived that the light of the present invention is entirely self-contained, and carries its own power source. The light utilizes nearly universal mounting means, and accordingly is usable on most of the many different types of helmets currently available. It attaches to the helmet in a secure fashion, remaining in position on the helmet and not moving while the helmet is being worn. The light is capable of becoming detached from the helmet in the event of an accident to prevent it from snagging the helmet and causing injury When installed onto a helmet, the light of the present invention directs light to the rear and/or sides to provide a highly visible safety signal. It is easily installable, and requires no complex installation or tools to install. It is removable, enabling it to be taken off of the helmet whenever the motorcycle is not in use. The improved light of the present invention also accomplishes all of the aforesaid objectives and advantages without incurring any significant disadvantage.

DESCRIPTION OF THE DRAWINGS

These and other advantages of the present invention are best understood with reference to the drawings, in which:

FIG. 1 is a side view of a motorcycle helmet with the preferred embodiment of the detachable light of the present invention mounted thereon;

FIG. 2 is a top plan view of the detachable light shown in FIG. 1, illustrating the configuration of the tension mount bracket;

FIG. 3 is a back view of the light assembly of the detachable light shown in FIGS. 1 and 2, which includes a battery compartment, a switch, and a light compartment;

FIG. 4 is an outside plan view of an adjustable side grip assembly which may be used with the detachable light of the present invention;

FIG. 5 is an inside view of the adjustable side grip assembly shown in FIG. 4;

FIG. 6 is a perspective view of the first embodiment for the rear grip pad used to prevent the light assembly from slipping down on the helmet;

FIG. 7 is a perspective view of a second embodiment for the rear grip pad used to prevent the light assembly from slipping down on the helmet;

FIG. 8 is a prospective view of a third embodiment for the rear grip pad used to prevent the light assembly from slipping down on the helmet;

FIG. 9 is a top view of a side grip assembly containing an integral battery compartment;

FIG. 10 is a top view of a side grip assembly having a battery compartment mounted thereon;

FIG. 11 is a perspective view of a rear grip pad having a VELCRO-type (hook and pile type) surface thereon;

FIG. 12 is a perspective view of a VELCRO-type (hook and pile types) strip for mating with the VELCRO-type (hook and pile type) surface of the rear grip pad shown in FIG. 11, the VELCRO-type (hook and pile type) strip having an adhesive surface on the back side thereof;

FIG. 13 is a side view of a motorcycle helmet with a first alternate embodiment of the detachable light of the present invention using an elastic strap to mount onto the helmet;

FIG. 14 is a side view of a motorcycle helmet with a second alternate embodiment of the detachable light of the present invention using elastic straps with hooks to mount onto the helmet;

FIG. 15 is a sideview of a motorcycle helmet with a third alternate embodiment of the detachable light of the present invention using plastic screws to mount onto the helmet; and FIG. 16 is a side view of a motorcycle helmet with a fourth alternate embodiment of the detachable light of the present invention using snaps to mount onto the helmet.

FIG. 17 is a perspective view of a plastic cover used in another embodiment of the invention.

FIG. 18 is a perspective view of another embodiment of the detachable light with the cover removed.

FIG. 19 is a perspective view of a flexible mounting member used to secure the light assembly to a helmet.

FIG. 20 is a perspective view of another mounting member which is secured to the helmet and adapted to receive the flexible mounting member shown in FIG. 19.

DETAILED DESCRIPTION OF THE PREFERRED EMBODIMENT

The preferred embodiment of the present invention is illustrated in FIGS. 1 through 3, and is shown installed on a helmet 20 in FIG. 1. The safety light device, indicated generally by 22, includes a light assembly 24 located at the back of the helmet 20, which light assembly 24 includes in the preferred embodiment a housing or compartment for containing a battery (not shown), a light bulb 26 (not shown in FIG. 1 through 3), a switch 28, and the wiring between these components (not shown).

Also shown as a part of the light assembly 24 is a plastic lens 30, which in the preferred embodiment is colored red or amber. Attached near the top of the light assembly 24 at the left and right sides thereof are two brackets 32 and 34 used to mount the light assembly 24 onto the rest of the safety light device 22. The brackets 32 and 34 extend forward from the light assembly 24 to the support apparatus which is used to mount the safety light device 22 on the helmet 20.

The support apparatus of the preferred embodiment is a resilient tension mount having two curved support arms 36 and 38 which encircle the helmet 20 from the back to the sides thereof and are biased inwardly at the sides to grasp the helmet 20 firmly to support the entire safety light device 22. The support arms 36 and 38 are preferably made of a single thin segment of material, as for example a rod of spring steel or plastic material. Spring steel is preferred due to the nature of the support apparatus, since the support arms 36 and 38 must press inwardly against the sides of the helmet 20 with a strong enough force to grasp the helmet 20 and thereby maintain the safety light device 22 in position on the helmet 20. Some plastics are equally resilient to spring steel, however, and such materials could also be used for the support arms 36 and 38.

In the preferred embodiment, the support arms 36 and 38 are made of a single continuous segment of material extending through apertures in the forwardmost portions of the brackets 32 and 34. The segment of the support arm 36 around the location at which it passes through the aperture in the bracket 32 is a threaded portion 40 Likewise, the segment of the support arm 38 around the location at which it passes through the aperture in the bracket 34 is a threaded portion 42.

Located between the brackets 32 and 34 is a rear support pad 44, which is also shown in detail in FIG. 6. The rear support pad 44 is roughly triangular in cross section, with the side 46 which is to face the back of the helmet 20 having an inward curvature to better grasp the back of the helmet 20. The side 46 of the rear support pad 44 facing the helmet 20 also has a plurality of small raised segments 48 to better grasp the helmet 20 and to resist movement on the surface of the helmet 20. The rear support pad 44 is preferably made of an elastomeric material such as rubber to provide excellent frictional contact on the surface of the helmet 20.

The rear support pad 44 has an aperture 50 extending laterally therethrough, which aperture 50 is sized to admit the continuous segment of material comprising the support arms 36 and 38. The rear support pad 44 is located between the brackets 32 and 34, with the support arm 36 extending out of the left side of the rear support pad 44 through the bracket 32 and around the left side of the helmet 20, and the support arm 38 extending out of the right side of the rear support pad 44 through the bracket 34 and around the right side of the helmet 20. A nut 52 on the threaded portion 40 of the support arm 36 and a nut 54 on the threaded portion 42 of the support arm 38 are tightened against the brackets 32 and 34, respectively, thereby adjusting the position of the light assembly 24 with respect to the rear support pad 44. By using this adjustment, the light assembly 24 can be adjusted properly for virtually any type of helmet 20.

Mounted at the front of the support arms 36 and 38 are side grip pads 56 and 58, respectively. The side grip pads 56 and 58 are also made of elastomeric material such as rubber to provide excellent frictional contact on the sides of the helmet 20. The side 60 of the side grip pad 56 facing the helmet 20 contains a plurality of the small raised segments 64 to better grasp the left side of the helmet 20. Likewise, the side 62 of the side grip pad 58 facing the helmet 20 contains a plurality of the small raised segments 66 to better grasp the right side of the helmet 20.

The side grip pads 56 and 58 are rotatably mounted on the ends of the support arms 36 and 38, respectively, to allow the side grip pads 56 and 58 to evenly contact the sides of the helmet 20. The installation of the safety light device 22 is quite simple, and may be explained with reference to FIGS. 1 and 2. The ends of the support arms 36 and 38 carrying the side grip pads 56 and 58 are pulled apart to allow them to be placed around the sides of the helmet 20. The rear support pad 44 is placed properly on the back of the helmet 20 near the bottom thereof, as shown in FIG. 1. The outward pull on the support arms 36 and 38 is released when the side grip pads 56 and 58 are properly placed slightly above the bottom of the helmet 20 at the sides thereof, completing the installation of the safety light device 22 on the helmet 20.

It will be appreciated that the safety light device 22 is easy to install and remove. In addition, in an accident the safety light device 22 would come off quickly, preventing the helmet 20 from becoming snagged due to the presence of the safety light device 22.

Optionally, the side grip pads 56 and 58 may be made to be adjustable on the support arms 36 and 38, to allow helmets 20 of widely varying sizes to be properly fitted. One such variation in the design of the support arms 36 and the side grip pad 56 is shown in FIGS. 4 and 5. The side grip pad 56 is manufactured with a short receiving arm 68 attached at the rear of the side grip pad 56. The short receiving arm 68 is threaded on the inside portion thereof, as indicated at 70, to receive the end of the support arm 36, which has a threaded end portion 72.

The outside of the short receiving arm 68 is drilled and tapped at two locations for receiving two lock screws 74 and 76. With the two lock screws 74 and 76 loosened, the threaded end portion 72 of the support arm 36 is screwed into the threaded portion 70 of the short receiving arm 68 until the side grip pad 56 is at the desired location on the support arm 36. The two lock screws 74 and 76 are then tightened, to retain the support arm 36 in the short receiving arm 68. The safety light device 22 should be positioned on the helmet 20 before the two lock screws 74 and 76 are tightened to ensure that the side grip pad 56 will fit with the side 60 containing the small raised segments 64 flat against the side of the helmet 20. Modification of the support arm 38 and the side grip pad 58 may be accomplished in a similar fashion.

FIG. 7 shows a first alternative to the construction of the rear support pad 44. A rear support pad 78 is shown which is essentially circular in cross section. The rear support pad 78 has a plurality of small raised segments 80 thereon, and is also made of an elastomeric material such as rubber to ensure good frictional contact with the back of the helmet 20. The rear support pad 78 also has an aperture 82 extending therethrough to admit the segment including the support arms 36 and 38. The rear support pad 78 is particularly useful with helmets having a large raised bead (not shown) at the bottom thereof, since the round configuration of the rear support pad 78 will readily remain on the back of a helmet immediately adjacent such a raised bead.

A second alternative design to the construction of the rear support pad 44 is shown in FIG. 8. A rear support pad 84 of tapered cross section is illustrated, with a relatively large side 86 having an inward curvature for contacting the back of the helmet 20. Disposed on the side 86 are a plurality of small raised segments 88 for contacting the back of the helmet 20. The rear support pad 84 is also preferably made of an elastomeric material such as rubber to obtain a good frictional contact with the back of the helmet 20. Completing the construction of the rear support pad 84 is an aperture 90 extending therethrough to admit the segment including the support arms 36 and 38.

A third alternative design to the construction of the rear support pad 44 is shown in FIG. 11. A rear grip pad 108 is illustrated which is similar in configuration to the rear support pad 44 shown in FIG. 6. The rear grip pad 108 has a side 110 which will face the back of the helmet 20, which side 110 is smooth and is configured with a curvature to match the curvature on the back of helmet 20.

The rear grip pad 108 uses mating male and female strips, best known as VELCRO-type strips (VELCRO being a trademark). The female strip is covered with curly strands or loops of material, and the male strip has a large number of flexible resilient plastic hooks thereon. When the male and female hooks are pressed against one another, the hooks in the male strip become entangled with the loops in the female strip, retaining the two strips together until they are forced apart. The force to separate the male and female strips is much higher than the force required to press them together.

The side 110 of the side grip pad 108 would have, for example, a male strip thereon. A female strip 116 having an adhesive surface 118 on the back side thereof as shown in FIG. 12 would be secured to the back of the helmet 20 by the adhesive surface 118. The rear grip pad 108 would then be attached to the helmet 20 by pressing the male strip 114 on the rear grip pad 108 against the female strip 116 on the back of the helmet 20. Once attached, rear grip pad 108 prevents the light assembly 24 from sliding downward at the rear of helmet 20.

It will be recognized that a female strip could be used on the side of the grip pad 108 and a male strip could be adhesively attached to the back of the helmet 20 without departing from the concept. The female strip could also be secured directly to the light assembly 24 rather than to the grip pad 108 without departing from the scope of the invention. Moreover it, will be recognized that the utilization of VELCRO (hook and pile fastener) as described above can also be used in a similar manner on rear grip pads which are similar in configuration to the alternate rear support pads 78 and 84.

In another departure from the design of the preferred embodiment illustrated in FIGS. 1 through 3, the battery may be located at the end of one of the support arms 36 or 38. Referring to FIG. 9, an alternate design replacing the side grip pad 56 is illustrated. A side grip pad 92 is illustrated with a battery compartment 94 mounted thereto. The side grip pad 92 has a side 96 opposite the side on which the battery compartment 94 is mounted, which side 96 will face the side of the helmet 20. On the side 96 of the side grip pad 92 are a plurality of small raised segments 98; like the side grip pad 56 it replaces, the side grip pad 92 is made of elastomeric material such as rubber to provide excellent friction characteristic to retain it in place on the side of the helmet 20.

The support arm 36 is mounted between the side grip pad 92 and the battery compartment 94, preferably in a rotatable fashion to allow the side 96 of the side grip pad 92 to move to contact the side of the helmet 20 fully. Wires (not shown) would run between the battery compartment 94 at the end of the support arm 36 and the light assembly 24 at the rear of the helmet 20, and the light assembly 24 would be smaller since it would not have to contain a battery therein. In order to extend the operating life of the safety light device 22, an additional battery compartment (not shown) could be mounted on the end of the support arm 38 as well.

FIG. 10 illustrates a second design approach to mounting a battery compartment at the end of the support arm 36. A side grip pad 100 which is identical to the side grip pad 56 but somewhat thinner is mounted at the end of the support arm 36. The side 102 of the side grip pad 100 facing the helmet 20 has a plurality of small raised segments 104, and the side grip pad 100 is also made of an elastomeric material such as rubber. A battery compartment 106 is removably attached to the side of the side grip pad 100 away from the side 102.

Several different approaches to mounting the light assembly 24 on the back of the helmet 20 are shown in the remaining figures. In FIG. 13, instead of utilizing the continuous segment of material, which has support arms 36 and 38, to fasten the rear support pad 44 between brackets 32 and 34, a bolt (not shown) and nut 52a are used to fasten the rear support pad 44 between brackets 32 and 34 in an adjustable manner. On the sides of the light assembly 24 are two strap supports 122 and 124 (124 is not shown). An elastic strap 126, having an adjustable length, is attached at one end to the strap support 122 and at the other end to the strap support 124.

The device is installed by placing the rear support pad 44 with the light assembly 24 attached on the back of the helmet 20 near the bottom thereof, and placing the elastic strap 126 around the front of the helmet 20 along the chin protector, as shown in FIG. 13. It will be appreciated that the light assembly 24 is easy to install and remove using the elastic strap 126, and that the use of the elastic strap 126 allows the entire device to be stored in a pocket. In addition, in an accident; snaps 127 would release the device, preventing the helmet 20 from becoming snagged due to the light assembly 24.

A variation of the embodiment shown in FIG. 13 is illustrated in FIG. 14, which uses two elastic straps 128 and 130 (130 is not shown). The elastic strap 128 is attached at one end to strap support 122 via snap 127 with hook 132 at the end thereof. Likewise, the elastic strap 130 is attached at one end to the strap support 124 and has a hook (not shown) at the other end thereof.

The installation of the device shown in FIG. 14 is also simple. The rear support pad 44 with the light assembly 24 attached is placed on the back of the helmet 20 near the bottom thereof. The elastic strap 128 is brought around the left side of the helmet 20, and the hook 132 is attached to the edge of the helmet 20 on the left side where the opening for the face or face shield (not shown) is located. Likewise, the elastic strap 130 is brought around the right side of the helmet 20, and the hook 134 is attached to the edge of the helmet 20 on the right side where the opening for the face or face shield is located.

It will be appreciated that the light assembly 24 is easy to install and remove using the elastic straps 128 and 130, and that the use of the elastic straps 128 and 130 allows the entire device to be stored in a pocket. Again, in an accident the device would once again come off easily by release of snap 127, preventing the helmet 20 from becoming snagged due to the light assembly 24.

The FIG. 15 and 16 embodiments of the invention do not have all of the advantages of the previous embodiments, but do retain the ease of installation and removal, and the safety aspect of the invention. In FIG. 15 two small tapped holes 136 and 138 are made in the helmet 20. The light assembly 24 is mounted to these two small tapped holes 136 and 138 using two plastic bolts 140 and 142, two plastic washers 144 and 146, and two rubber washers 148 and 150. The plastic lens 30 is then snapped onto the light assembly 24.

In FIG. 16, two male snaps 152 and 154 are attached to the back of the helmet 20. Two female snaps 156 and 158 are located on the back of the light assembly 24, which also has the plastic lens 30 installed thereon. By snapping the female snaps 156 and 158 on the light assembly 24 onto the male snaps 152 and 154 on 20, the light assembly 24 is mounted on the helmet 20.

FIGS. 17-20 disclose still another embodiment of the invention and show a modified form of the light assembly. The basic unit 24a shown in FIG. 18 has a base 160 with two upstanding, flexible connecting members 162 and 164. Base 160 carries lamp 26a, , lamp support 27 and circuitry 29 which is connected to a source of power, such as a battery (not shown) contained in container 31. Lamp 26a is turned off and on by switch 28a.

FIG. 17 discloses a plastic cover 30a which can be made of a red, transparent, plastic material. Cover 30a has a plurality of cammed projections 166 and 168 which are designed to mate with members 162 and 164 to hold cover 30a on base 160, all in a well known manner of fastening two members together FIG. 19 shows a flexible aluminum strip 170 having a plurality of openings 172 therein. Strip 170 can be secured to base 160 by any desired fastening means, such as bolts, rivets, snaps, etc. (not shown). When complete, the light assembly shown in FIG. 18 includes cover 30a and strip 170 secured thereto.

FIG. 20 discloses a helmet connection member 190 comprising an elongated base 180 having a pair of pockets 182 and 184 on opposed ends thereof; member 190 is adapted to be secured to helmet 20 permanently, as, by glueing, or releasably as by providing VELCRO (hook and pile fastener) on the helmet 20 and underside of member 190 in the manner hereinabove discussed. Pockets 182 and 184 are adapted to receive and releasably retain the opposed arms of flexible strip 170 to retain the light assembly 24a on the helmet 20.

It will therefore be perceived that the light of the present invention is entirely self-contained, carrying its own power source. The light utilizes universal mounting means, and accordingly is usable on any of the many different types of helmets currently available. It attaches to the helmet in a secure fashion using one of the several different mounting means disclosed above, and remains in position on the helmet and does not move while the helmet is being worn. The light will become detached from the helmet in the event of an accident to prevent it from snagging the helmet and causing injury.

The light of the present invention directs light from the rear and sides of the helmet to provide a highly visible safety signal. It is easily installable, and requires no complex installation or tools to install. It is easily removable, enabling it to be taken off of the helmet whenever the motorcycle is not in use. The improved light of the present invention accomplishes all of the aforesaid objectives and advantages without incurring any significant disadvantage whatsoever.

Although an exemplary embodiment of the present invention has been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A detachable light for installation in a helmet having a base which encircles a wearers head to form a chin protection comprising:
   (a) a light assembly including an electrical lamp and power source for energizing said lamp,
   (b) maintaining means for removably securing said light assembly to a predetermined position on said helmet, said maintaining means including,
      (1) an elastic strap attached at one end thereof to the left side of said light assembly and at the other end thereof to the right side of said housing,
      (2) said elastic band being stretched around the base and chin protector portion of said helmet to maintain said light assembly in said predetermined position.

2. The detachable light of claim 1, wherein said light assembly includes:
   a housing,
   said lamp installed in said housing,
   a storage compartment for said power source, and
   a switch for selectively connecting the power source to said lamp.

3. A detachable light as defined in claim 2, additionally comprising:
   a lens mounted on said housing over said electrical lamp, said lens directing light from said detachable light rearwards and sidewards.

4. A detachable light as defined in claim 2, wherein said lens is colored.

5. A detachable light as defined in claim 2, including a rear support pad secured to the housing and disposed between the housing and the helmet, wherein said rear support pad is roughly triangular in cross section, with the side of said rear support pad which is to face the back of said helmet having an inward curvature to better grasp the back of said helmet.

6. A detachable light as defined in claim 4, wherein the side of the rear support pad facing said helmet has a plurality of small raised segments disposed thereon to better grasp said helmet and to resist movement of said rear support pad on the surface of said helmet.

7. A detachable light as defined in claim 5, wherein said rear support pad is made of an elastomeric material to provide excellent frictional contact with the surface of said helmet.

8. A detachable light as defined in claim 2, including a rear support pad secured to the housing and disposed between the housing and the helmet wherein said rear support pad is roughly circular in cross section.

9. A detachable light as defined in claim 8, said rear support pad has a plurality of small raised segments disposed thereon to better grasp said helmet and to resist movement of said rear support pad on the surface of said helmet.

10. A detachable light as defined in claim 8, wherein said rear support pad is made of an elastomeric material to provide excellent frictional contact with the surface of said helmet.

11. A detachable light as defined in claim 2, including a rear support pad secured to the housing disposed between the housing and the helmet, wherein said rear support pad is of tapered cross section, with a relatively large side having an inward curvature for contacting the back of said helmet.

12. A detachable light as defined in claim 11, wherein the side of said rear support pad facing said helmet has a plurality of small raised segments disposed thereon to better grasp said helmet and to resist movement of said rear support pad on the surface of said helmet.

13. A detachable light as defined in claim 11, wherein said rear support pad is made of an elastomeric material to provide excellent frictional contact with the surface of said helmet.

14. A detachable light as defined in claim 2, wherein said power source storage compartment is located in said housing.

15. A detachable light as defined in claim 2, wherein the length of said elastic strap is variable.

16. The detachable light as defined in claim 15 and further including releasable snap means on said strap.

* * * * *